UNITED STATES PATENT OFFICE.

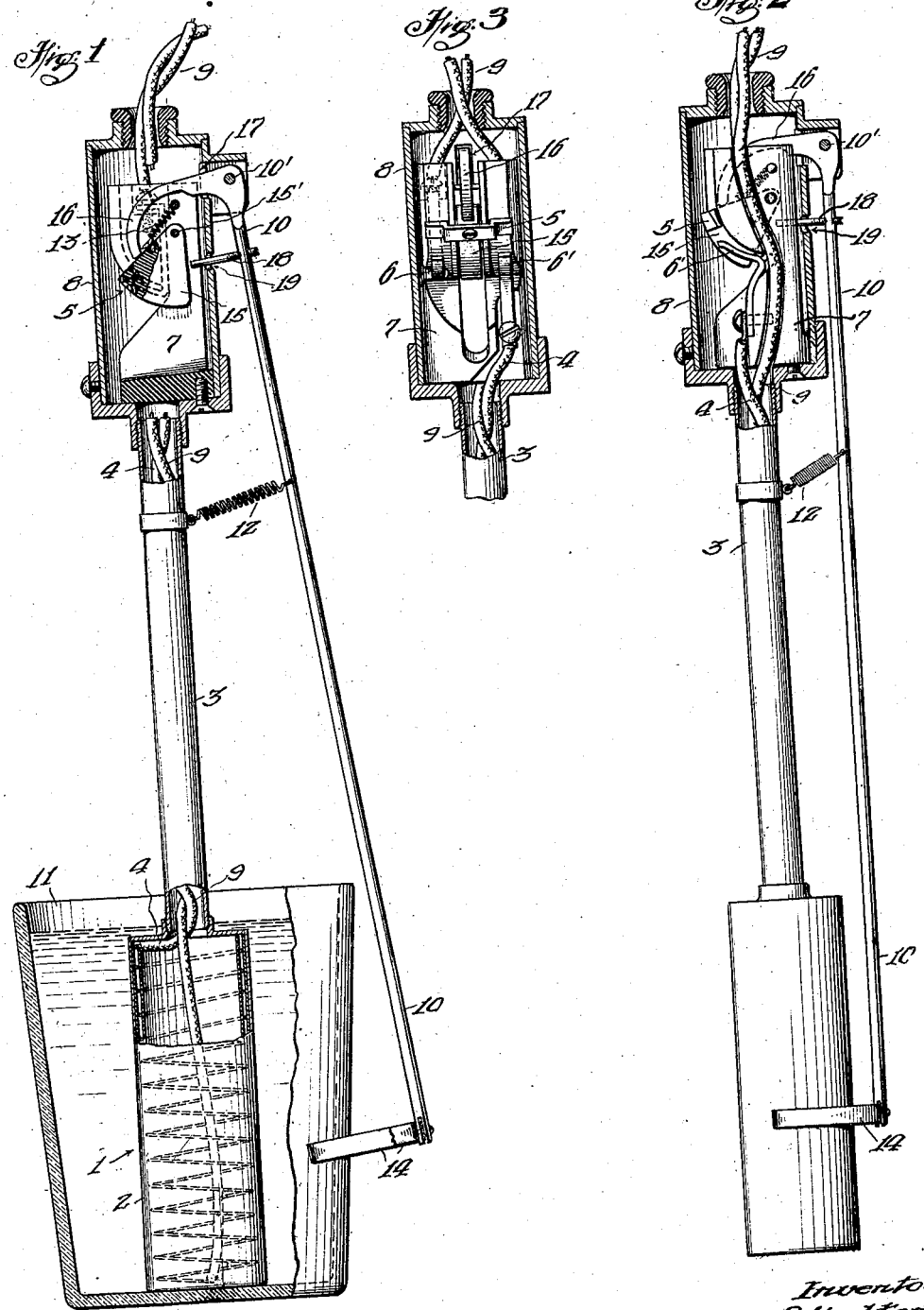

CHARLES S. WALTON, OF LOS ANGELES, CALIFORNIA.

SAFETY DEVICE FOR IMMERSION-HEATERS.

994,351.	Specification of Letters Patent.	Patented June 6, 1911.

Application filed February 25, 1911. Serial No. 610,947.

*To all whom it may concern:*

Be it known that I, CHARLES S. WALTON, a citizen of the United States, residing at Los Angeles, in the county of Los Angeles and State of California, have invented a new and useful Safety Device for Immersion-Heaters, of which the following is a specification.

This invention relates to means for safeguarding immersion electric heaters from being burned out by reason of their removal from the liquid to be heated without turning off the current.

In the use of immersion heaters it often happens that the party using the same, after having placed the heater in the liquid, removes it from the liquid and neglects to turn off the current therefrom, with the result that the accumulation of heat in the heater causes injury thereto, for example, by burning out the heating element.

The present invention provides for automatically breaking the current to the heater as soon as the heater is removed from the receptacle containing the liquid to be heated. The construction of the device is preferably such that before the heater can be used a switch device must be moved to close the circuit to the heater, said device being maintained in closed position as long as the heater is in operation, but being moved to open position automatically when the heater is removed from the liquid.

The accompanying drawings illustrate the invention, and referring thereto:—

Figure 1 is a vertical section of the heater in operative position within a liquid containing receptacle. Fig. 2 is a side elevation of the heater in normal or inoperative position, parts of the device being shown in section. Fig. 3 is a side elevation at right angles to Fig. 2 of the switch means, the inclosing case therefor being shown in section.

The heater comprises a heating element indicated at 1 mounted within a casing or body 2 provided with a stem 3, said stem being tubular and containing the leading wires for supplying current to the heating element. At the upper end of the stem 3 is provided a switch comprising a movable contact 5 and fixed contacts 6 and 6', said contacts being supported on an insulating head 7 within a switch casing 8. Supply wires 9 constituting, for example, an electric cord, are provided for the device, one of said wires being connected to said switch. A member consisting, for example, of a lever 10 is mounted on the device in operative relation to the switch and provided with means for engaging a receptacle or vessel 11 containing the liquid to be heated, said lever or member 10 being normally drawn by spring 12 to position to move the switch aforesaid to open position, and being operated to move the switch to closed position when the device is to be used. Spring 12 may be connected to lever 10 and to stem 3. Lever 10 may be provided with guard means for engaging the receptacle 11, the guard means on the lever 10 consisting, for example, of a U-shaped member 14 adapted to partly embrace and engage the outside of the receptacle 11 so as to hold the member or lever 10 in extended position, in which it is distended or separated from the stem 3 and the heater body or casing 2, the spring 12 normally holding said guard means 14 close to the said body 2, as shown in Fig. 2.

Any suitable form of switch means may be used, that shown in the drawings being suitable for the purpose as it provides for quick break, and comprises an arm 15 of insulating material pivoted at 15' on the insulating support 7 and carrying the movable contact 5 of the switch, said contact bridging the two fixed contacts 6, 6'. Contact 6 is connected to one of the supply wires 9, and contact 6' is connected to a wire 4 leading through the tubular member 3 to the heating element. The other wire 9 extends directly through the tubular member 3 to the heating element. A spring 13 connected to arm 15 tends to draw said arm upwardly to open the switch. The lever 10 is pivoted at 10' on the switch casing 8 and has an arm 16 extending through a slot 17 in said casing and above the insulating arm 15, so as to depress said insulating arm into position to close the switch when the lever 10 is moved away from the stem 3, as shown in Fig. 1. Lever 10 is further provided with a projection consisting, for example, of a screw 18 screwed therethrough and extending through an opening 19 in the wall of the casing 8 to contact with the rear or lower face of the insulating arm 15 to knock or push the switch out of closed position, it being understood that the contacts of the switch will close with some friction so as to insure good contact, and it is necessary to dislodge the same to enable the switch to be opened by the spring 13, said spring operating to open the switch with a quick break as soon as the movable contact 5 has been pushed from the fixed contacts 6 and 6'.

The operation is as follows:—Normally or when the device is not in use, the lever 10 will be held toward the body of the device by the spring 12, the insulating arm 15 being in elevated position so as to raise the movable contact 5 away from the fixed contacts 6 and 6'. Before inserting the heater in the glass or other receptacle containing the liquid to be heated, the lever 10 is operated or pulled away from the body of the heater and in this movement the arm 16 of said lever engages the insulating arm 15, causing the movable contact 5 to be moved into contact with the fixed contacts 6 and 6'. Current then passes to the heating element from the wires 9 through the switch 5, 6, 6'. The heating element is then placed in the liquid to be heated, the lever 10 being arranged on the outside of the receptacle 11 for such liquid, so that the wall of the said receptacle engages said lever or the projection or guard 14 thereon so as to hold the lever in distended position, thereby maintaining the circuit closed as long as the heater is kept in the receptacle. As soon as the heater is removed from the receptacle, the spring 12 throws the lever to collapsed or folded position, causing the projection 18 to engage the insulating arm 15 of the switch, and throws said switch open, the opening movement being quickly completed by the spring 13 so as to break the arc.

What I claim is:—

1. In combination with an electric immersion heater, a switch controlling the circuit thereof, and means movably mounted on said heater and controlling said switch, said controlling means having a portion extending alongside the heater to engage the wall of a receptacle in which the heater is placed.

2. In combination with an electric immersion heater, a switch controlling the circuit thereof, means movably mounted on said heater and controlling said switch, said controlling means having a portion extending alongside the heater to engage the wall of a receptacle in which the heater is placed, and spring means operating on said controlling means to move the same to open the switch.

3. In combination with an electric immersion heater comprising a heating element, electric supply connections therefor, a switch carried by the device and controlling said supply connections, and controlling means for said switch adapted and arranged for engagement with the wall of the receptacle in which the heater is to be immersed to hold the switch in closed position, and means tending to move the switch to open position.

4. In combination with an electric immersion heater, a switch controlling the circuit thereof, and means for controlling said switch movably mounted on said heater and engaging the receptacle when the heater is placed therein, said controlling means being thereby maintained in a definite position relative to the heater.

In testimony whereof, I have hereunto set my hand at Los Angeles, California, this 18th day of February, 1911.

CHARLES S. WALTON.

In presence of—
ARTHUR P. KNIGHT,
FRANK L. A. GRAHAM.

---

Copies of this patent may be obtained for five cents each, by addressing the "Commissioner of Patents, Washington, D. C."